United States Patent [19]

Sigrist

[11] 4,108,474

[45] Aug. 22, 1978

[54] FIXATION CLAMP FOR AIR PUMP HOSE

[76] Inventor: Paul Sigrist, Hauptstrasse 126, Orpund, Switzerland, CH-2552

[21] Appl. No.: 759,573

[22] Filed: Jan. 14, 1977

[30] Foreign Application Priority Data

Jan. 15, 1976 [CH] Switzerland .................... 361/76

[51] Int. Cl.² .............................................. F16L 35/00
[52] U.S. Cl. ........................................ 285/12; 285/23; 285/39
[58] Field of Search ................... 285/39, 12, DIG. 12, 285/425, 23; 81/177 E; 145/62, 61 J; 137/231

[56] References Cited

U.S. PATENT DOCUMENTS

| Re. 22,181 | 9/1942 | Schilling | 285/DIG. 12 X |
|---|---|---|---|
| 273,621 | 3/1883 | Small | 145/62 X |
| 1,045,495 | 11/1912 | Austin | 285/12 X |
| 1,410,032 | 3/1922 | Palmer | 81/177 E X |
| 1,484,342 | 2/1924 | Schweinert | 137/231 |
| 2,453,669 | 11/1948 | Meneses | 285/DIG. 12 X |
| 3,215,456 | 11/1965 | Schmid | 285/DIG. 12 X |
| 3,827,635 | 8/1974 | Krakowski et al. | 137/223 X |
| 3,933,177 | 1/1976 | Dwyer, Jr. | 137/223 X |

FOREIGN PATENT DOCUMENTS 27,991 of 1911 United Kingdom ..................... 137/231

*Primary Examiner*—Thomas F. Callaghan
*Attorney, Agent, or Firm*—Miller & Prestia

[57] ABSTRACT

The temporary airtight connection of a connection hose of an air pump with a tube valve is effected by a fixation clamp presenting fastening means for connecting pieces.

1 Claim, 6 Drawing Figures

FIXATION CLAMP FOR AIR PUMP HOSE

BACKGROUND OF THE INVENTION

In connecting an air pump hose in an airtight manner to a tube valve it is usual to clamp an end part of the hose to the threaded valve tube. However, it is difficult to always do so, particularly with valve types presenting no bearing surface for the clamp. Therefore connecting pieces have been developed which can be screwed on the threaded valve tube to create an artificial bearing surface. However, the known fixation clamps present the disadvantage, that said connecting pieces cannot be affixed to them and therefore will usually not be disposable when they should be used.

SUMMARY OF THE INVENTION

It is one object of the present invention to realize a fixation clamp onto which at least one connecting piece can be affixed during its non-use.

It is a further object of the present invention to develop a fixation clamp onto which two connecting pieces can be affixed by threaded parts.

It is still an other object of the present invention to create a fixation clamp with two bent parts having threaded holes into which the connecting pieces can be screwed together.

BRIEF DESCRIPTION OF THE DRAWING

The three types of tube valves mainly used as well as one embodiment of the invention are described below with reference to the drawing in which.

DETAILED DESCRIPTION OF THE INVENTION

Figure 1:
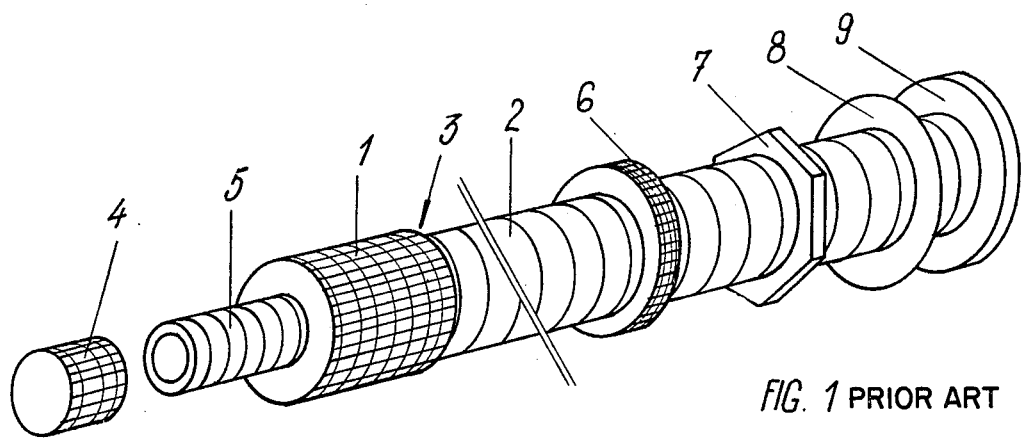
FIG. 1 is a perspective view of a first type of tube valves frequently used.

Referring now to the drawing, FIG. 1 shows a first type of a common tube valve frequently used with tubes for bicycles. The known fixation clamp can easily be clamped to these valves, since they present, on their open end, a cap 1 which is screwed on the threaded tube 2 of the valve and therefore forms a bearing surface 3 for the fixation clamp. Further shown parts of said tube valve are a cover cap 4, a valve tube 5, a knurled nut 6, a hexagon nut 7 and a washer 8 which will be pressed against a counterplate 9 to compress the not shown tube rubber.

Figure 2:
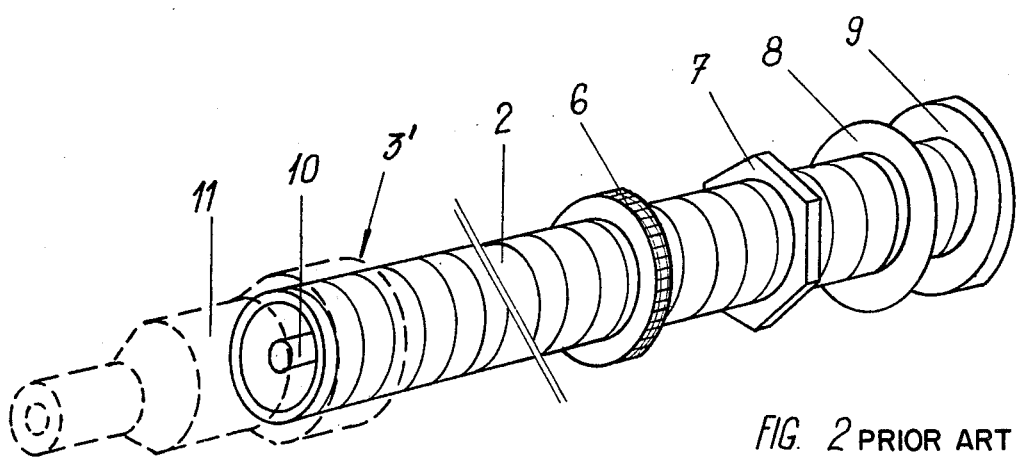
FIG. 2 is a perspective view of a second type of tube valves frequently used.

FIG. 2 shows a second type of a common tube valve frequently used in connection with tubes for car and motorcycle tires. This valve type comprises, in addition to the parts 2 and 6 to 9 described in relation with the valve of FIG. 1, a valve tappet 10. It does, however, not present any cap 1 or the like forming a bearing surface for the fixation clamp. Therefore an artificial bearing surface 3' has to be formed on it by screwing a connecting piece 11, according to FIG. 4, onto the threaded tube 2.

Figure 3:
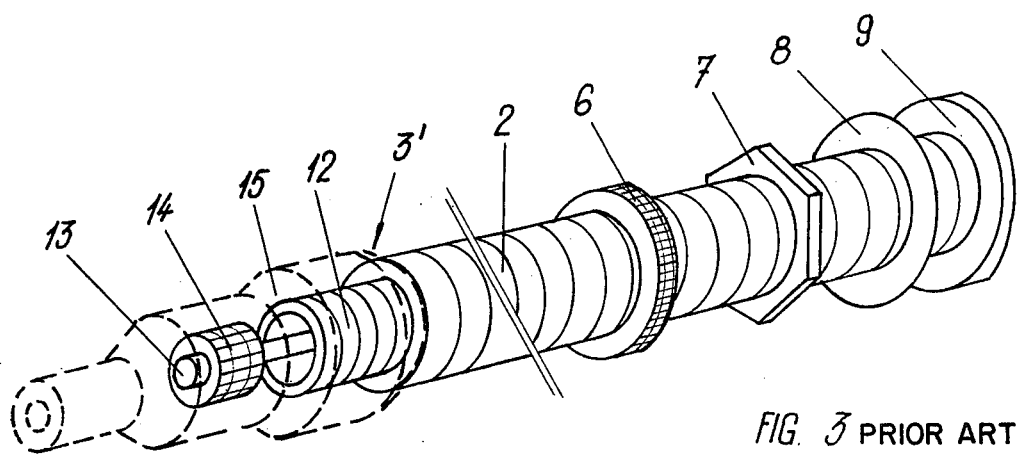
FIG. 3 is a perspective view of a third type of tube valves frequently used.

The tube valve shown in FIG. 3 is commonly used in France in connection with tubes for bicycle tires. It does also not present any part forming a bearing surface for the fixation clamp. In addition to the elements 2 and 6 to 9 defined above it, however includes a thread 12 and a valve tappet 13 onto which a limitation nut 14 is screwed. To form an artificial bearing surface 3', this valve type has to be combined with a connecting piece 15, as illustrated in FIG. 5, which can be screwed on the thread 12.

Figure 4:
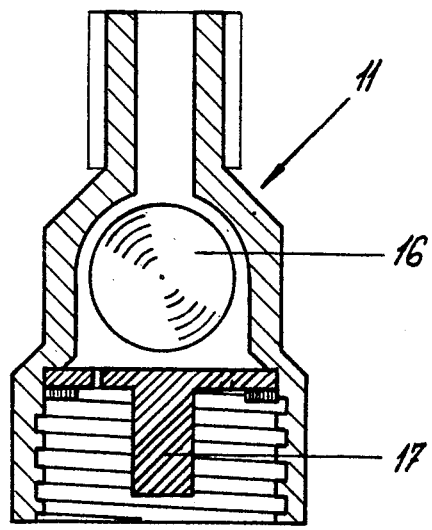
FIG. 4 is a cross section of a kind of connecting pieces used in combination with the tube valves according to FIG. 2.

FIG. 4 shows a cross section of the connecting piece 11 which will advantageously be used in connection with the second valve type, as described hereinbefore with reference to FIG. 2. This connecting piece comprises a ball 16 and a valve opening pin 17. By screwing it on the threaded tube 2, the pin 17 presses down the valve tappet 10 and opens the valve mechanically. The tube, however, keeps closed, since the ball 16 acts as valve. A mechanical opening of this kind of tube valves is often necessary, because they are stuck.

Figure 5:
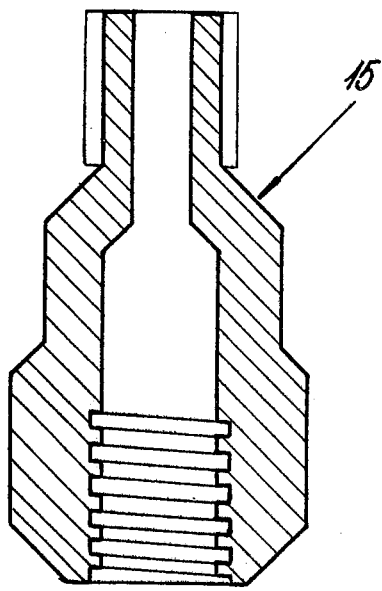
FIG. 5 is a cross section of a kind of connecting pieces used in connection with the tube valves according to FIG. 3 and, FIG. 6 is a perspective view of the described embodiment of the fixation clamp according to the present invention.

Since this effect usually does not appear with the valve type of FIG. 3, these can be combined with connecting pieces 15 as shown in FIG. 5.

Figure 6:
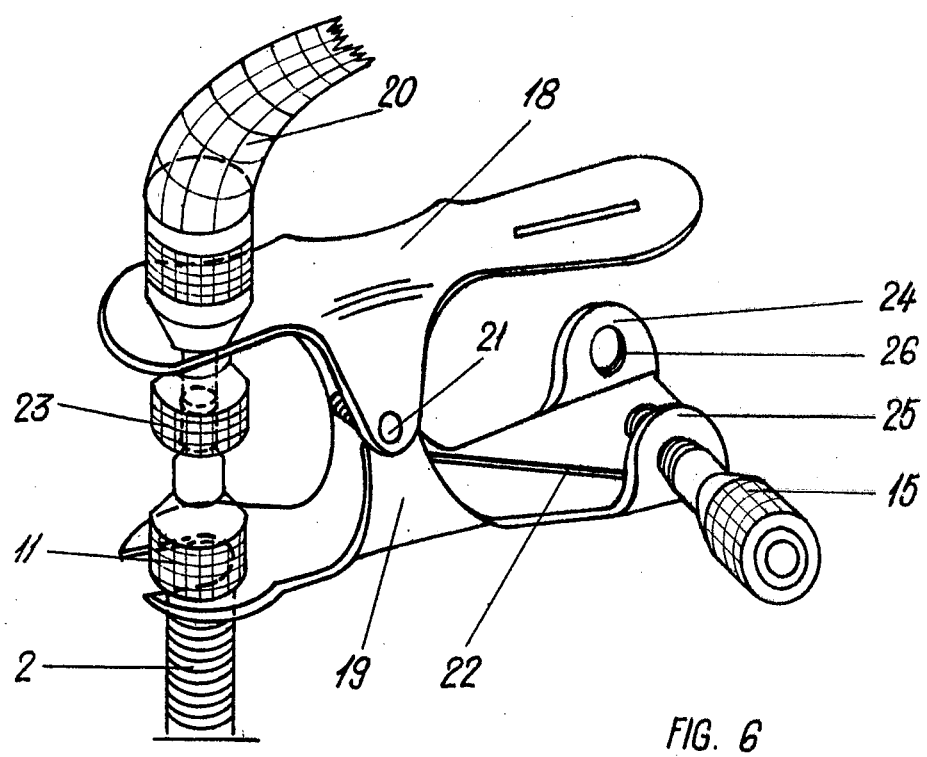

Referring now to FIG. 6, an embodiment of a fixation clamp according to the present invention comprises two clamp halves 18 and 19. Clamp half 18 is connected to an air pump hose 20 and in 21 rotatably connected to clamp half 19. Both clamp halves 18 and 19 are compressed together on their shorter ends by a spring 22. By the same spring action an end piece 23 of the air pump hose 20 is pressed on a valve or one of the connecting pieces 11 or 15. One of the clamp halves, here clamp half 19 advantageously comprises fastening means for affixing the connecting pieces 11 or 15 to the clamp during their non-use. Said fastening means can be formed by bent parts 24 and 25 of the clamp and comprise threaded holes 26, into which said connecting pieces 11 and 15 can be screwed in the illustrated way.

The fastening means, however, can also be formed differently; e.g. by parts containing springs which hold the connecting pieces. Further the fastening means can be formed by threaded holes, onto which the connecting pieces can be screwed. Hooks and chains can serve the same purpose.

Compared to the known fixation clamps the invention presents the advantage, that all necessary parts are always ready for use and by hand if they are needed to connect an air pump hose to any one of the usual tube valves.

I claim:

1. A fixation clamp for connecting a tube valve to an air pump hose comprising a pair of adaptors for mounting on said tube valve and said air pump hose to provide a connection, first and second arm members having work engaging ends for engaging said tube valve or its adaptor and said air pump hose end for biasing them toward each other, means pivotably securing said arms intermediate their ends, spring means between said arms adapted to normally draw said work engaging ends together, said work engaging end of said first arm having a U-shaped recess for engaging said tube valve or its adaptor, said work engaging end of said second arm having an orifice for engaging said air pump hose, and means on one of said arms for holding said adaptors when not in use.

* * * * *